Nov. 3, 1970

R. E. FROST 3,537,725

TROUGH-LIKE SEAL FOR ROLLER ASSEMBLY

Filed Nov. 5, 1968

INVENTOR.
RUBEN E. FROST
BY Price, Heneveld
Huizenga & Cooper

ATTORNEYS

United States Patent Office 3,537,725
Patented Nov. 3, 1970

3,537,725
TROUGH-LIKE SEAL FOR ROLLER ASSEMBLY
Ruben E. Frost, Grand Rapids, Mich., assignor to C. L. Frost & Son, Inc., Grand Rapids, Mich., a corporation of Michigan
Filed Nov. 5, 1968, Ser. No. 773,490
Int. Cl. F16c 33/78
U.S. Cl. 308—187.2
13 Claims

ABSTRACT OF THE DISCLOSURE

This disclosure relates to a seal structure for a bearing assembly in which roller bearings are sealed between an outer and inner race. The seal structure has an outer seal ring, an intermediate seal ring, and an inner seal ring. The outer seal ring and the intermediate seal ring are fixed to the inner race. The inner seal ring is fixed to the outer race and has an axial ring portion which extends axially outwardly. A radial outwardly extending flange forms a trough at the axial outer portion of the inner seal ring axial ring portion. Another trough is formed between the outer and the intermediate seal rings. A drain hole is provided in the outer seal ring to drain the liquid which accumulates in the trough.

---

This invention relates to a seal structure, especially for bearings employed in wet atmospheres. In one of its aspects, the invention relates to a seal structure for roller bearings in which a pair of troughs are formed from sealing members and a drain hole is provided to release the liquid accumulating in the troughs.

Carriages having roller bearings are used for conveyor systems in many industrial manufacturing operations. Frequently, the conveyors must carry parts through areas of very high moisture content such as spray baths in which water sprays come in contact with the parts and the conveyor. High moisture areas and particularly water sprays are quite hard on the bearing structures as the moisture or water penetrates the seals and causes deterioration of the bearings.

Most bearing structures are intended to seal dirt out and grease in. Well known labyrinth seals are quite efficient for this purpose. However, these seals do not keep the water out of the bearings. As the race members rotate relative to each other, the water can go from one radial land to the other until it reaches the central area at the bearings.

I have now discovered a new and improved seal having a pair of troughs to catch water and a drain hole to permit release of water from the trough.

By various aspects of this invention one or more of the following, or other, objects can be obtained.

It is an object of this invention to provide an improved seal for roller bearings in which the seal retains the lubricant at the bearings and excludes dirt and moisture.

It is a further object of this invention to provide a low friction seal for roller bearings, especially for use in water spray operations.

It is a still further object of this invention to provide an improved seal for roller bearings in which seals the water is collected and sprayed without opportunity for seeping into the bearings.

Other aspects, objects, and the several advantages of this invention are apparent to one skilled in the art from a study of this disclosure, the drawings, and the appended claims.

Briefly, the invention provides a seal structure for a roller bearing assembly. Three axially spaced seal rings form at least one trough which can collect water and prevent the same from seeping into the interior of the wheels. Preferably, a second trough is formed and a drain hole is provided to discharge collected water and dirt to the exterior of the wheels.

Figure 1:
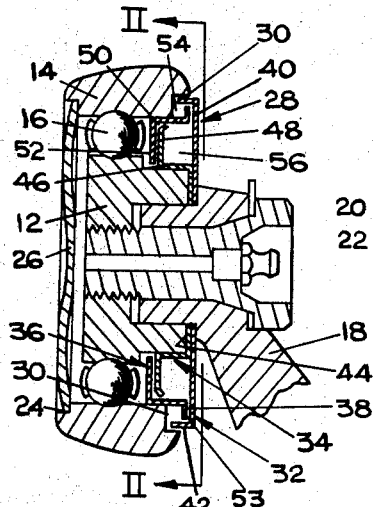
Figure 2:
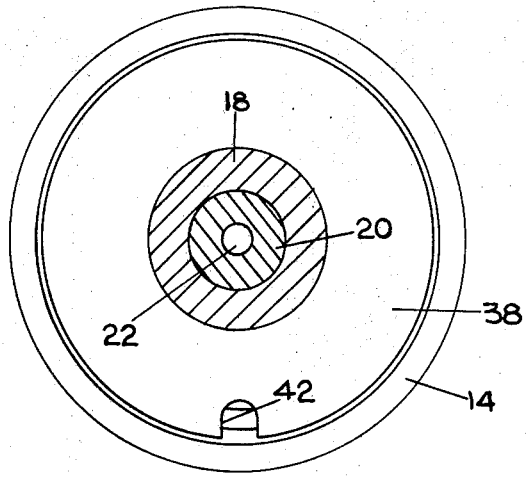
Figure 3:
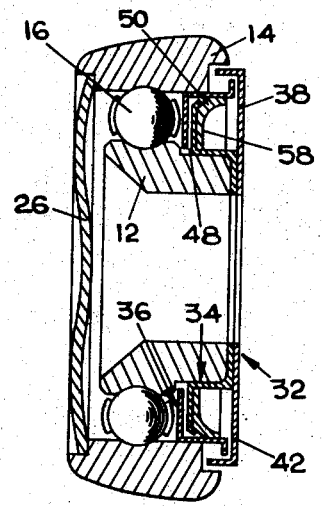
Figure 4:
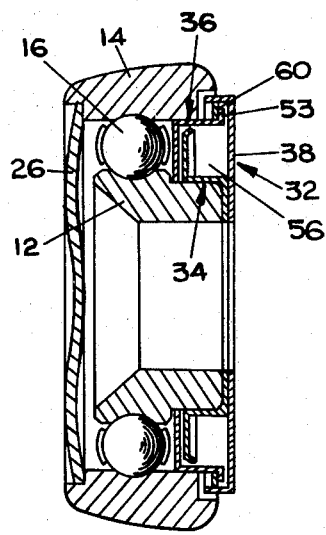
Figure 5:
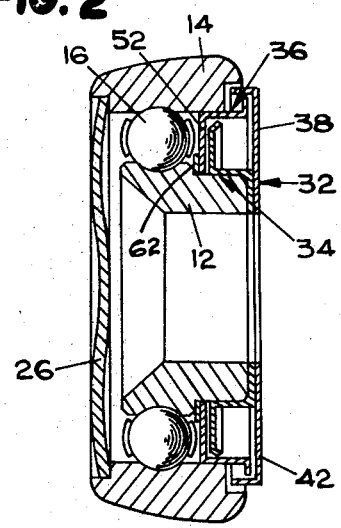
Figure 6:
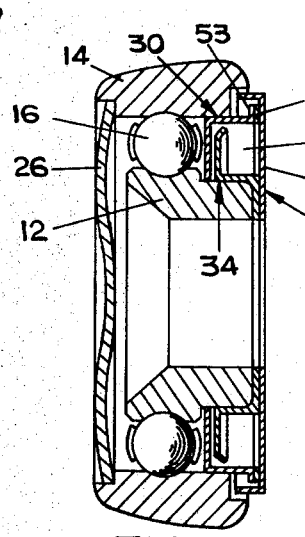

The invention will now be described with reference to the accompanying drawings in which:

FIG. 1 is a cross sectional view of a roller bearing assembly having a seal according to the invention;
FIG. 2 is a side elevational view taken along lines II—II of FIG. 1;
FIG. 3 is a view, similar to FIG. 1, showing a first modification of the invention;
FIG. 4 is a view, similar to FIGS. 1 and 3, illustrating a second modification of the invention;
FIG. 5 is a view, similar to FIGS. 1, 3 and 4, illustrating a third modification of the invention; and
FIG. 6 is a view, similar to FIGS. 1 and 3 through 5, illustrating a fourth modification of the invention.

Referring now to the drawings and to FIGS. 1 and 2 in particular, a roller bearing assembly has an inner race 12, an outer race 14, and bearings 16 therebetween. The inner race 12 is fixed to an arm 18 through a stud 20. A lubricating passage 22 extends through the stud member and into the area containing the bearings 16.

The outer race 14 has an annular counterbore 24 and a sealing ring 26 positioned in the counterbore. The sealing ring 26 closes and seals one end of the bearing assembly. The outer race also has an annular recess 30 at the other axial end from the annular counterbore 24.

The other end of the bearing is sealed by a novel seal 28 comprising an outer sealing ring 32, an intermediate sealing ring 34, and an inner sealing ring 36.

The outer sealig ring 32 has a radial annular flange 38 by which it is fixed to the inner race 12. An axial annular flange 40 extends axially inwardly from the outer radial end of the annular flange 38. A drain hole 42 is provided in the bottom of the radial annular flange 38 for a purpose which will be described hereinafter.

The intermediate sealing ring 34 has a radial attaching flange 44 by which the sealing ring is fixed to the inner race 12. An axial cylindrical portion 46 extends inwardly from the radial attaching flange 44 and joins a radially outwardly extending portion 48 with an axially outwardly turned lip on the end thereof.

The inner sealing ring 36 has an axial ring portion 50 by which the sealing ring 36 is fixed to the outer race 14. A radially inwardly extending portion 52 depends from the inner portion of the axial ring portion 50 and is spaced axially inwardly of the radially outwardly extending portion 48 of the intermediate sealing ring 34. A radially outwardly extending lip 53 extends from the axial outward end of ring portion 50. The combination of the annular recess 30 with the axial ring portion 50 and radially outwardly extending lip 53 form a trough 54 for the collection of water which passes around the edge of the outer sealing ring 32. Water which collects in trough 54 can be discharged from the seal area through drain hole 42 as the outer race 14 rotates about the inner race 12.

The combination of the radial annular flange 48, the axial cylindrical portion 46 of intermediate sealing ring 34, and the radial annular flange 38 of the outer sealing ring form a second trough 56 within the seal area. This second trough collects water and dirt which passes over the radially outwardly extending lip of the inner sealing ring 36. Accumulations of water and dirt will tend to flow around to the bottom of the trough and out drain hole 42. The axially outwardly extending lip on the radially outwardly extending portion 48 tends to force the water toward the drain hole as it runs downwardly within the trough 56.

In the embodiment shown in FIGS. 1 and 2, a portion of an overhead conveyor trolley has been shown. In this system, the inner race remains fixed and the load is carried by arm 18. The outer race 14 rotates about the inner race 12. The invention is particularly suitable for such systems, especially when they are used in conditions of heavy moisture. However, it is within the broad scope of the invention to employ the novel seal on any type of bearing assembly. For example, the seal could be employed in bearing structures in which the inner race rotates and the outer race remains rotatably fixed.

Reference is now made to FIG. 3 which shows a first modification of the invention. In this modification like numerals have been used to describe like parts. In this first modification, the seal assembly is exactly the same as the first modification except that a nonmetallic sealing ring 58 has been fixed to the radially outwardly extend portion 48. This sealing ring 58 contacts and wipes against the axial ring portion 50 of the inner sealing ring 36 thereby providing a wiping seal between the intermediate sealing ring 34 and the inner sealing ring 36. The nonmetallic sealing ring is preferably a plastic material such as the so-called self-lubricating plastic. Examples of suitable materials are Teflon, nylon, and polyethylene.

Reference is now made to FIG. 4 which shows a second modification of the invention. In this figure, like numerals have been used to designate like parts. In this modification, the seal is identical with the seal of FIG. 1 except that a nonmetallic sealing ring 60 has been fixed to the inner side of the radially outwardly extending lip 53 and no drain hole is provided in the bottom of the radial annular flange 38. In operation, this nonmetallic sealing member contacts and wipes against the axial annular flange 40 of the outer sealing ring 32. This modification provides a wiping seal between the intermediate sealing ring 34 and the outer sealing ring 32. The nonmetallic sealing ring can be made from the same material as the sealing ring 58 of the modification shown in FIG. 3.

Reference is now made to FIG. 5 which illustrates a third modification of the invention, and in which figure like numerals have been used to designate like parts. The seal is identical with that shown in FIG. 1 except that a nonmetallic sealing ring 62 is fixed to the axial and radial inner portion of radially inwardly extending portion 52 of the inner sealing ring 36. This nonmetallic sealing ring 62 can be made of the same material as sealing ring 58 and wipes against the inner raceway portion of inner race 12. In this seal assembly a wiping seal is provided between the inner sealing ring 36 and the inner race portion of the inner race 12. In operation, the nonmetallic sealing ring 62 wipes against the inner race member to prevent dirt and moisture from penetrating into the bearing area.

Reference is now made to FIG. 6 which shows a fourth modification of the invention. In this modification, like numerals have been used to designate like parts. In this assembly, the seal is the same as FIG. 1 except no drain hole has been provided in the bottom of radial annular flange 38. Further, a nonmetallic sealing ring 64 is fixed to the outer axial side of radially outwardly extending lip 53. This nonmetallic sealing ring 64 can be made of the same material as the sealing ring 58 and wipes against the inner axial side of radial anular flange 38. This seal assembly, like that of FIG. 4, provides a wiping seal betwen the inner sealing ring 36 and the outer sealing ring 32 to substantially eliminate passage of dirt and moisture into the trough area 56 and into the bearing area.

Whereas the invention has been described and illustrated with reference to a bearing assembly in which the novel seal is used at one axail end only, it is within the scope of the invention to employ the novel seal in both axial ends of the bearing assembly.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a roller bearing assembly comprising an outer race, an inner race, bearing means between said outer and inner race, and means axially sealing said bearing means between said outer and inner race to retain lubrication at said bearings between said outer and inner race and to exclude dirt and moisture from said bearings, the improvement in said axial sealing means comprising:

an outer radial sealing ring fixed to said inner race and having an outer radial edge extending in close proximity to said outer race;

an intermediate sealing ring fixed to said inner race and axially spaced from said outer sealing ring so as to form a first trough therebetween for collection of water and dirt;

said intermediate sealing ring having a radial outer edge just short of an inner diameter of said outer race;

an inner sealing ring fixed to said outer race and having a depending annular flange extending toward said inner race and spaced axially inwardly of said intermediate sealing ring in substantial overlapping relationship with said intermediate sealing ring, said inner sealing ring having an axial ring portion in engagement with said outer race extending axially outwardly of said depending annular flange and axially outwardly of said intermediate sealing ring short of said outer radial sealing ring, an outer portion of said axial ring extending from said outer race to repel foreign matter outwardly of said bearings.

2. A roller bearing assembly according to claim 1 wherein said outer portion of said axial ring portion has a radially outwardly extending portion forming a second trough at the upper portion of said sealing means outwardly of said intermediate sealing ring to collect water which passes around said outer radial edge of said outer radial sealing ring.

3. The roller bearing assembly of claim 2 wherein said outer radial sealing ring has a drain opening at an outer radial edge thereof to permit escape of water which passes around said outer radial edge and accumulates in said trough.

4. A roller bearing assembly according to claim 3 wherein said intermediate sealing ring has an axially outwardly extending lip on the outer radial end thereof to urge water and dirt accumulating in said first trough toward said drain opening.

5. The roller bearing assembly of claim 1 wherein said inner race is a stationary member and said outer race rotates about said inner race, said outer race has an inner annular recess, said inner sealing ring has on an outer axial end of said axial ring portion a radially outwardly extending portion which extends into said recess forming a second trough at an upper portion of said sealing means, said outer radial edge of said outer sealing ring extends radially outwardly of said axial ring radially outwardly extending portion and has an axial annular flange extending axially inwardly at said outer radial edge into said annular recess of said outer race and axially inwardly of said axial ring radially outwardly extending portion, whereby moisture passing around said outer sealing ring tends to collect in said second trough.

6. A roller bearing assembly according to claim 5 wherein said outer sealing ring has a drain opening at a bottom portion thereof to premit drainage of liquids which collect in said first and second troughs.

7. A roller bearing assembly according to claim 5 further comprising a flexible nonmetallic sealing ring member fixed to said intermediate sealing ring and contacting said axial ring portion of said inner sealing ring.

8. A roller bearing assembly according to claim 5 further comprising a nonmetallic sealing ring fixed to said radially outwardly extending portion of said inner sealing ring and in sliding contact with said axial flange of said outer sealing means.

9. A roller bearing assembly according to claim 5 further comprising a nonmetallic sealing ring fixed to an inner end of said depending annular flange of said inner sealing ring and in sliding contact with said inner race portion.

10. A roller bearing assembly according to claim 5 further comprising a nonmetallic sealing ring fixed to said radially outwardly extending portion of said inner sealing ring and in sliding contact with said outer radial sealing ring.

11. A roller bearing assembly according to claim 1 further comprising a self-lubricating sealing means between said outer and inner sealing rings.

12. A roller bearing assembly according to claim 1 further comprising a self-lubricating sealing means between said intermediate and said inner sealing rings.

13. A roller bearing assembly according to claim 1 further comprising a self-lubricating sealing means between said inner sealing ring and said inner race.

References Cited

UNITED STATES PATENTS

| | | | |
|---|---|---|---|
| 2,003,000 | 5/1935 | Kepe | 308—187.1 |
| 2,133,230 | 10/1938 | Sanders | 308—187.1 |
| 2,250,167 | 7/1941 | Niles | 308—187 X |
| 2,702,868 | 2/1955 | Kindig | 308—20 |
| 2,770,506 | 11/1956 | Derner | 308—187 |
| 2,868,567 | 1/1959 | Kindig | 308—187.1 |
| 3,093,425 | 6/1963 | Rich | 308—36.1 |
| 3,101,954 | 8/1963 | Huddle | 308—187.2 |
| 3,447,843 | 6/1969 | Shipman | 308—187.1 |

FOREIGN PATENTS

| | | |
|---|---|---|
| 514,842 | 7/1955 | Canada. |
| 569,214 | 1/1959 | Canada. |
| 924,605 | 4/1963 | Great Britain. |
| 88,414 | 11/1956 | Norway. |

FRED C. MATTERN, JR., Primary Examiner

FRANK SUSKO, Assistant Examiner

REEXAMINATION CERTIFICATE (187th)
United States Patent [19]
Frost

[11] B1 3,537,725
[45] Certificate Issued Apr. 3, 1984

[54] TROUGH-LIKE SEAL FOR ROLLER ASSEMBLY

[75] Inventor: Ruben E. Frost, Grand Rapids, Mich.

[73] Assignee: C. L. Frost & Son, Inc., Grand Rapids, Mich.

Reexamination Request:
No. 90/000,341, Mar. 10, 1983

Reexamination Certificate for:
Patent No.: 3,537,725
Issued: Nov. 3, 1970
Appl. No.: 773,490
Filed: Nov. 5, 1968

[51] Int. Cl.³ ............................................. F16C 33/80
[52] U.S. Cl. ................................................. 308/187.2

[56] References Cited
U.S. PATENT DOCUMENTS

| | | | |
|---|---|---|---|
| 1,145,516 | 7/1915 | Schmid-Roost | 308/187.1 |
| 1,503,920 | 8/1924 | Schneebeli | 308/187 |
| 1,737,036 | 11/1929 | Wego | 308/187 |
| 1,793,190 | 2/1931 | Philips | 308/187.1 |
| 2,074,901 | 3/1937 | Gotthardt et al. | 308/187.1 |
| 2,250,167 | 7/1941 | Niles et al. | 308/187 |
| 2,702,868 | 2/1955 | Kindig . | |
| 2,868,567 | 1/1959 | Kindig . | |
| 3,093,425 | 6/1963 | Rich, Jr. . | |
| 3,447,843 | 6/1969 | Shipman . | |

OTHER PUBLICATIONS

"Impervon" descriptive document cited by Patent Owner (prior art-no date).
Copy of Title Page, pages 6 and 7 from a Catalog published in 1952 by the Requester. ("Catalog No. 52").
Link-Belt General Catalog 600, Copyright 1934 by Link-Belt Company, Title page and pp. 609, 611, 613, 618 and 626.
Link-Belt General Catalog 800, Copyright 1939 by Link-Belt Company, Title page and pages 1063, 1067, 1069, 1071, 1086 and 1091.

Primary Examiner—Lenard A. Footland

[57] ABSTRACT

This disclosure relates to a seal structure for a bearing assembly in which roller bearings are sealed between an outer and inner race. The seal structure has an outer seal ring, an intermediate seal ring, and an inner seal ring. The outer seal ring and the intermediate seal ring are fixed to the inner race. The inner seal ring is fixed to the outer race and has an axial ring portion which extends axially outwardly. A radial outwardly extending flange forms a trough at the axial outer portion of the inner seal ring axial ring portion. Another trough is formed between the outer and the intermediate seal rings. A drain hole is provided in the outer seal ring to drain the liquid which accumulates in the trough.

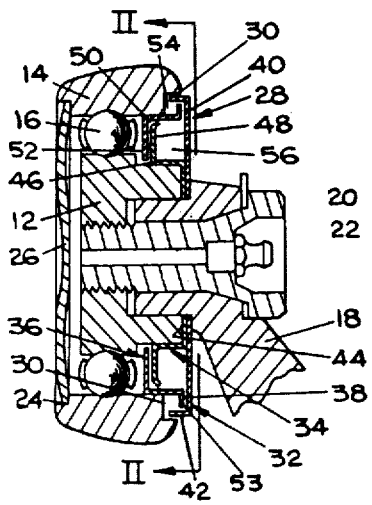

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–13 is confirmed.

* * * * *